United States Patent [19]

Chalupa et al.

[11] 3,949,090

[45] Apr. 6, 1976

[54] METHODS AND COMPOSITIONS FOR IMPROVING FEED EFFICIENCY IN RUMINANTS USING DITHIOOXAMIDE

[75] Inventors: William V. Chalupa, Malvern; Roger C. Parish, King of Prussia, both of Pa.

[73] Assignee: SmithKline Corporation, Philadelphia, Pa.

[22] Filed: Aug. 26, 1974

[21] Appl. No.: 500,815

[52] U.S. Cl. .................... 424/328; 424/320; 426/2
[51] Int. Cl.$^2$ ..................................... A61K 31/145
[58] Field of Search ............................ 424/320, 328

[56] References Cited
UNITED STATES PATENTS 3,010,870    11/1961    Luckenbaugh .................... 424/320
3,347,677    10/1967    Jaworski et al. .................... 426/182

OTHER PUBLICATIONS

Chemical Abstracts, Vol. 58 (1963), p. 11171b.

*Primary Examiner*—V. D. Turner
*Attorney, Agent, or Firm*—William H. Edgerton

[57] ABSTRACT

Compositions and methods for improving the feed efficiency of ruminant animals comprise using dithiooxamide as an active ingredient. Dithiooxamide inhibits both methanogenesis and microbial degradation of amino acids in the rumen.

5 Claims, No Drawings

METHODS AND COMPOSITIONS FOR IMPROVING FEED EFFICIENCY IN RUMINANTS USING DITHIOOXAMIDE

This invention relates to the use of dithiooxamide as an active ingredient in ruminant feed compositions and methods for increasing the feed efficiency of commercial ruminants, especially cattle and sheep and especially in healthy animals.

In the prior art there has been described a number of active ingredients which selectively inhibit microbiological processes in the rumen. For example, certain halo containing compounds have been reported to inhibit methanogenesis in the normal rumen thereby diverting carbon containing nutritive fragments from methane gas normally excreted by the ruminant into usable fatty acids, such as propionic or butyric acid. One example of this development is described in U.S. Pat. No. 3,663,710. Another development has been the inhibition of microbial deamination in the rumen by certain iodonium salts which allows more efficient use of both amino acids in the natural diet or those added to the ruminants diet. See for example Rhodesian Pat. No. 121/74 published June 4, 1974 or South African Pat. No. 74/1203 filed Feb. 25, 1974. In neither of these applications should the overall fermentation of the rumen be disturbed so that the animal will continue to feed normally with no reduced intake of feed. Also, the palatability of the feed composition must be acceptable to the animal.

We have unexpectedly fond that dithiooxamide used as an active ingredient improves ruminant animal performance by both antimethanogenesis and microbial deamination inhibition. In this manner feed efficiency and weight gain are increased. This discovery is the basis of the present invention.

Dithiooxamide is used for complexing metal ions in analytical chemistry. Among the reports of biological effects by this compound in the art of which we have knowledge are the following.

U.S. Pat. No. 3,701,831 discloses but does not claim this compound among a huge series of thioureas and thiomides used to inhibit dopamine $\beta$-hydroxylate. The specific disclosed uses are to treat alcoholism or heart trouble.

U.S. Pat. No. 3,010,870 discloses the use of dithiooxamide to kill nematodes in soil. Other references are for substituted dithiooxamides to control plant growth, for insecticidal or fungicidal use.

U.S. Pat. No. 3,347,677 discloses the use of a large series of thiooxamide derivatives, one of which is dithiooxamide to potentiate a specific group of antioxidants in general feed compositions. The compositions and methods of this invention disclosed herein are intended not to include the use of the dithiooxamide in feed compositions which contain the antioxidants of the U.S. Pat. No. 3,347,677, namely 2,2,4-trimethyl-1,2-dihydroquinolines.

The methods of this invention comprise the oral administration to commercial ruminant animals, such as sheep or cattle, of a quantity of dithiooxamide which is nontoxic to the animal but which improves ruminant animal performance. The quantity is one which will inhibit methanogenesis and microbial deamination in the rumen but one which will not depress or interrupt the overall fermentation of the rumen. Feed intake must not be depressed, nor must any toxic effects of the dithiooxamide be evident.

In practice this quantity of active ingredient is chosen from a broad range of from about 0.012–25 g./head/day, preferably about 0.3–25 g./head/day of dithiooxamide. More precisely, sheep most likely will ingest active ingredients chosen from the range of about 0.012–10 g./head/day, preferably about 0.60–2 g./head/day. Cattle will ingest about 0.10–25 g./head/day, preferably 0.5–5 g./head/day. These values are based on the average weight of feeder sheep or cattle as described in standard references. If animals of differing body weight are considered, proportional quantities will be ingested.

Most conveniently the active ingredient will be distributed uniformly throughout normal feed or special feed rations of the ruminant animal. However, any oral administration common to the art can be used, for example, salt blocks for pasture use, distribution in drinking water or as granules coated with various slicones, waxes or resins.

The supplemental feed material is most often made available to the ruminant to feed ad libitum in the field, barn or fattening pen. On other occasions precise portions of the feed may be offered to selected head. Under ad libitum feeding, the more usual situation, a sheep of average weight will ingest 3–4 lbs. of feed a day; an average steer, 10–25 lbs. of feed a day. The ruminant subjects are also most usually healthy animals which are being fed as feeder cattle and sheep preparatory for marketing as meat producing animals. However, the method can also be applied to wool or milk-producing sheep or cattle.

The compositions of this invention are ruminant feed compositions supplemented by dithiooxamide sufficient to supply the quantities suggested above. Usually, the ingredient is dispersed throughout the carrier uniformly. Examples of such carriers are soybean meal, corn oil, ground corn, barley, wheat, mineral mixtures such as vermiculite, diatomaceous earth, pectin, corn gluten meal, corn distillers solubles, soyflour, ensilage or various chopped hay or grain products familar to those skilled in this art. The composition can be either a complete feed product or a premix composition. The latter contains a measured unit amount of the active ingredient in concentrated form with a carrier, such as those mentioned above. The premix is mixed with the whole diet of the ruminant or with a secondary feed product by the mixer, fattener or grower. Normally the premix will contain from 5–75% of active ingredient.

The animal feeds may also include roughages, such as cellulose, hay, straw, silages, corn stalks, cotton seed hulls, oats, barley and cereal brans; natural oils such as animal fats, fish oils, safflower oil, peanut oil and cottonseed oil; antioxidants but not those of U.S. Pat. No. 3,347,677, minerals, vitamins, antibiotics such as virginiamycin or tetracycline, anthelmintics such as oxibendazole, parbendazole or thiabendazole and other appropriate medicaments or additives known to the art Examples of typical prepared animal feed are as follows:

EXAMPLE 1

| Ingredient | Weight per cent |
|---|---|
| Silage | 45.0 |
| Chopped hay | 40.0 |
| Peanut oil meal | 7.0 |
| Molasses | 7.0 |
| Dicalcium phosphate | 0.5 |

EXAMPLE 1-continued

| Ingredient | Weight per cent |
| --- | --- |
| Trace mineral salt | .5 |
| Vitamin A | 300 I.U./lb. |
| Vitamin D | 150 I.U./lb. |
| Dithiooxamide | 0.05 or 1 lb./ton |

EXAMPLE 2

An example of a suitable premix is as follows:

| Ingredient | Weight percent |
| --- | --- |
| Dithiooxamide | 1 lb. |
| Vermiculite | to 5 lbs. |

EXAMPLE 3

In the field the active ingredients may be administered by means of salt or molasses blocks. A typical block may be prepared using the following conditions:

| Ingredient | Weight per cent |
| --- | --- |
| Dried cane molasses | 44.54 |
| Ground soybean hulls | 24.90 |
| Dithiooxamide | 10.00 |
| Granulated salt | 21.59 |
| Trace minerals and vitamins | 0.20 |
| Stabilized animal fat | 1.11 |
| Moisture | 2.66 |

EXAMPLE 4 - Cattle Diet

| Ingredient | Weight per cent |
| --- | --- |
| Ground shelled corn | 65.85 |
| Ground hay | 20.00 |
| Dried molasses | 6.00 |
| Cottonseed meal | 6.00 |
| Dithiooxamide | 0.075 |
| Urea | .55 |
| Trace mineral salt | .50 |
| Dicalcium phosphate | .40 |
| Ground limestone | .70 |
| Vitamin A (30,000 units/gm.) | 66.7 gm./ton |
| Vitam $D_2$ (16,000,000 units/lb.) | 7.1 gm./ton |

In the whole ruminant feed, dithiooxamide will be present preferably at about 8 g.–5 kg./ton (0.004 g.–2.5 g./lb.) of whole feed, especially about 40 g.–1 kg./ton (0.02 g.–0.50 g./lb.). The upper portion of these ranges are most useful for cattle, the lower portion for lighter animals, such as sheep, goats or calves.

The method of this invention therefore generally comprises allowing the cattle or sheep to graze or be fed ad libitum on the supplemented rations or to be fed on a regular schedule.

Amounts of high protein containing feed constituents or essential amino acids may also be added to the whole feed or to a special feed carrier and feed with the active ingredients. Exemplary of such sources of supplemental amino acids are casein, oil seed meals such as soybean meal, linseed meal, cottonseed meal, peanut meal, rapeseed meal, fish meal, alfalfa meal, corn gluten meal, corn gluten feed, chopped alfalfa casein, or the amino acids themselves such as cysteine, methionine, lysine, threionine, isoleucine, arginine, valine, histidine, phenylalamine leucine and tryptophan.

The amino acid supplement may also be in coated or other form as desired, however, this is not necessary if enough dithiooxamide is present to decrease deamination significantly.

Generally, the amounts of such supplemental amino acids may be within limits known to the art; for example, from about 1–10 g. of methionine per lamb per day to 5–25 g. per steer or heifer per day. Methionine has been demonstrated to be particularly useful in increasing the quality of wool in sheep but amino acids generally are important in the nutrition of ruminants generally, especially in cattle and sheep, for a good growth and a high grade of meat. Generally it is desirable to supplement the food with large excess of natural feed constituents known to be rich in protein materials such as those listed above. These are relatively inexpensive.

Dithiooxamide was tested in vitro for activity using two assay procedures.

1. Effects upon Amino Acid deamination.

The in vitro fermentation system contained 50 ml. strained rumen fluid, 8 mM urea, 1 g. starch, 1.8 mM of each of 10 essential amino acids (threonine, valine, methionine, isoleucine, leucine, phenylalanine, tryptophan, lysine and arginine) and 0 to 100 ppm dithiooxamide. Flasks were incubated under a $CO_2$ atmosphere for 5 hours with total amino acids assayed prior to and at the end of the fermentation by the method of Borchers [Anal. Chem., 31, (7):1179]. Percent apparent inhibition of deamination in treated flasks was calculated relative to control flasks without added dithiooxamide. Apparent inhibition of deamination in excess of 100% may be observed because of the liberation of amino acids from proteinaceous materials contained in rumen fluid.

$$\text{Inhibition of deamination (\%)} = \frac{\text{Control deamination (\%)} - \text{Treated deamination (\%)}}{\text{Control deamination (\%)}} \times 100$$

TABLE I

Effect of Dithiooxamide on In Vitro Microbial Deaminase Inhibition (MDI)[1]

| ppm | Replications | MDI (%) |
| --- | --- | --- |
| 0 | 4 | 0 |
| 2.5 | 1 | 0 |
| 5 | 4 | 35 |
| 7.5 | 1 | 71 |
| 10 | 4 | 57 |
| 25 | 4 | 62 |
| 50 | 2 | 84 |
| 75 | 1 | 100 |
| 100 | 1 | 117 |

[1]In vitro fermentation system contained 50 ml. strained rumen fluid, 1 g. starch, 8 mM urea and 1.8 mM of each of ten essential amino acids. Flasks were incubated under a $CO_2$ atmosphere for five hours.

Data presented in Table I demonstrated that dithiooxamide is an effective inhibitor of microbial deamination of amino acids over a wide concentration range (i.e., 7.5 to 100 ppm).

2. Effects upon amino acid deamination, methanogenesis and volative fatty acid production.

The in vitro fermentation system contained 75 ml. strained rumen fluid, 200 mg, alfalfa hay, 800 mg. of a crude protein grain mixture, 0.8 to 1.6 mM of each of 10 essential amino acids (threonine, valine, methionine, isoleucine, leucine, phelylalanine, tryptophan, lysine and arginine), and 0 to 50 ppm dithiooxamide. Flasks were incubated for 4 hours with effects upon amino acid deamination assessed as described for the previous system. Using standard chromatographic techniques, effects upon methanogenesis and upon the pattern of volatile fatty acid production were determined.

1. Effects upon amino acid deamination.

TABLE II

Effect of Dithiooxamide on In Vitro Microbial Deaminase Inhibition (MDI), Methanogenesis and Pattern of Volatile Fatty Acid Production[1]

| Measurement | Dithiooxamide (ppm) | | | | |
|---|---|---|---|---|---|
| | 0 | 5 | 10 | 25 | 50 |
| MDI (%) | 0 | 6 | 68 | 65 | 94 |
| Methane Inhibition (%) | 0 | 12 | 88 | 96 | 99 |
| Volatile Fatty Acids (Molar Distribution, %) | | | | | |
| Acetate | 69 | 66 | 49 | 49 | 47 |
| Propionate | 9 | 10 | 15 | 15 | 15 |
| Butyrate | 22 | 24 | 36 | 36 | 38 |
| Volatile Fatty Acid Carbon ($\mu$ moles/ml.) | 128 | 127 | 108 | 108 | 102 |

[1]In vitro fermentation system contained 75 ml. strained rumen fluid, 200 mg. alfalfa hay, 800 mg. grain mixture (16% crude protein) and 1.6 mM of each of ten essential amino acids. Flasks were incubated for four hours.

Results presented in Table II confirmed that dithiooxamide was an effective inhibitor of microbial deamination of amino acids and also demonstrated that this chemical would suppress methane production. Because methane produced during ruminal metabolism has no energy value to the animal, diversion of methane carbon to other metabolites could enhance the efficiency of diet utilization. The increased molar percentages of propionate and butyrate at the expense of acetate would suggest that dithiooxamide would improve the efficiency of diet utilization since propionate and butyrate have been reported to be better energy metabolites than acetate for protein deposition in sheep (Potter, Purser and Cline, J. Nutr., 95: 655; Eskeland, Pfander and Preston, Brit. J. Nutr., 29: 347). Because amino acid carbon, following deamination, is incorporated into the scheme of volatile fatty acid production, the slight decrease in volatile fatty acid carbon associated with dithiooxamide additions is probably a reflection of inhibiting amino acid deamination.

Rumen fistulated cattle were fed a pelleted 60% concentrate diet. To conduct the test, animals received ruminal doses of a mixture of free amino acids to provide 338 mMoles of total free amino acids (threonine 4.5 g., methionine 6.0 g., isoleucine 5.0 g., leucine 5.0 g., phenylalanine 6.5 g., lysine 7.5 g., histidine 8.5 g.), 50 g. of a soluble rumen marker, polyethylene glycol (PEG) and 0 to 4 g. dithiooxamide. Total amino acid concentration was determined by the procedure of Borchers [Anal. Chem., 31 (7): 1179]. Activity was assessed as changes, with respect to time, of the quantity of total free amino acids in the rumen. Inhibition of rumen microbial deamination results in a greater quantity of free amino acids in the rumen.

TABLE IV

Effect of Dithiooxamide on Quantity of Amino Acids in the Rumen at 0, 3 and 6 Hours after Ruminal Dosing of an Essential Amino Acid Mixture, Dithiooxamide and Polyethylene Glycol[1]

| Dithio-oxamide | Replications | Hours After Dosing | | |
|---|---|---|---|---|
| | | 0 | 3 | 6 |
| | | mMoles[2] | mMoles[2] | mMoles[2] |
| 0 | 2 | 338 | 152 | 47 |
| 0.5 | 1 | 338 | 192 | 78 |
| 1.0 | 2 | 338 | 198 | 162 |
| 2.0 | 2 | 338 | 209 | 218 |
| 4.0 | 1 | 338 | 270 | 308 |

[1]Polyethylene glycol was used as a marker to estimate rumen volume and correct for changes in amino acid concentration due to changes in rumen volume during the six hour experiment.
[2]mMoles of amino acid per rumen.

TABLE III

Effects of Dithiooxamide, Cobalt and Copper on In Vitro Gas Production, Microbial Deaminase Inhibition (MDI) and Methane Inhibition[1]

| Dithiooxamide (ppm) | 0 | | | | | | 25 | | | |
|---|---|---|---|---|---|---|---|---|---|---|
| Cobalt Sulfate (ppm) | 0 | .013 | .067 | 0 | 0 | 0 | .013 | .066 | 0 | 0 |
| Copper Sulfate (ppm) | 0 | 0 | 0 | .067 | .333 | 0 | 0 | 0 | .067 | .333 |
| Gas Production (cc) | 65 | 65 | 65 | 65 | 64 | 85 | 82 | 86 | 85 | 83 |
| MDI (%) | 0 | 1 | 2 | 3 | 6 | 78 | 81 | 71 | 84 | 90 |
| Methane Inhibition (%) | 0 | 1 | −5 | −5 | −11 | 92 | 92 | 93 | 92 | 92 |
| Volatile Fatty Acids (molar distribution, %) | | | | | | | | | | |
| Acetate | 64 | 63 | 63 | 64 | 63 | 39 | 41 | 43 | 38 | 41 |
| Propionate | 15 | 15 | 15 | 15 | 15 | 21 | 20 | 20 | 21 | 21 |
| Butyrate | 21 | 22 | 22 | 21 | 22 | 40 | 39 | 37 | 41 | 38 |
| Volatile Fatty Acid Carbon ($\mu$ moles/ml.) | 125 | 120 | 127 | 123 | 121 | 119 | 127 | 133 | 114 | 132 |

[1]In vitro fermentation system contained 75 ml. strained rumen fluid, 200 mg. alfalfa hay, 800 mg. grain mixture (16% crude protein) and 0.8 mM of each of ten essential amino acids. Flasks were incubated for four hours.

Because dithiooxamides are well-known as metal chelating agents, the in vitro deaminase and methane inhibition could have been the result of binding essential metal cofactors. Deaminase and methane inhibition was not affected by adding varying concentrations of cobalt and copper to the in vitro system over a broad range of normal metal levels. Alterations in patterns of volatile fatty acid production were again observed and there were no effects on total volatile fatty acid carbon production.

Two types of in vivo experiments were conducted to evaluate the effects of dithiooxamide upon amino acid deamination and methanogenesis.

Data presented in Table IV demonstrates the free amino acids are almost completely degraded in the rumen within 6 hours and that dithiooxamide is an effective agent in preventing his degradation and increasing the size of the pool of amino acids in the rumen.

2. Effects upon methanogenesis.

Cattle were fed 5 to 7 kg./day of a 70% concentrate ration which was medicated to supply 0 to 2 g. of dithiooxamide per animal daily. After feeding medicated rations for at least 7 days, gas samples were obtained by rumen puncture for chromatographic assay of methane.

TABLE V

In Vivo Antimethanogenic Activity of Dithiooxamide[1]

| Measurement | Dithiooxamide (g./day) | | | |
|---|---|---|---|---|
| | 0 | .5 | 1.0 | 2.0 |
| Replications | 6 | 2 | 4 | 4 |
| Methane Inhibition | 0 | 25 | 51 | 85 |

[1]360 Kg. Cattle fed either 5, 6 or 7 kg./day.

Results presented in Table V verified the antimethanogenic activity of dithiooxamide.

The description above is designed to teach how to use the described invention but is not indicated to be limiting. For example, the active ingredient, dithiooxamide, is the sole chemical described as operative. We have found that substitution on the nitrogen atom ring tends to give compounds which are less active than the parent compound and, therefore, offer little advantage over the methods and compositions described. Also, dithiooxamide has been found relatively nontoxic when used as described even though the prior art describes these compounds as toxic to animals. The N-alkylated congeners are described to be particularly toxic.

What is claimed is:

1. A method of improving the feed efficiency of ruminant animals comprising administering orally to the animal a quantity of dithiooxamie which is sufficient to improve feed efficiency but not toxic to the animal.

2. The method of claim 1 in which the quantity of dithiooxamide orally administered is chosen from the range of about 0.012–25 g. per head per day.

3. The method of claim 1 in which the ruminant animal is sheep and the quantity of dithiooxamide is chosen from the range of about 0.60–2 g. per head per day.

4. The method of claim 1 in which the ruminant animal is cattle and the quantity of dithiooxamide is chosen from the range of about 0.5–5 g. per head per day.

5. The method of claim 1 in which the feed efficiency is accomplished by simultaneously inhibiting the methanogenesis and microbial deamination of amino acids in the rumen without affecting the overall fermentation of the rumen by orally administering to the animal a quantity of dithiooxamide chosen from about 0.3–25 g. per head per day

* * * * *